(12) United States Patent
Galbreath et al.

(10) Patent No.: US 10,728,216 B2
(45) Date of Patent: *Jul. 28, 2020

(54) WEB APPLICATION SECURITY ARCHITECTURE

(71) Applicant: Signal Sciences Corporation, Culver City, CA (US)

(72) Inventors: Nicholas Galbreath, Los Angeles, CA (US); Zane Lackey, New York, NY (US)

(73) Assignee: Signal Sciences Corporation, Culver City, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/890,036

(22) Filed: Feb. 6, 2018

(65) Prior Publication Data

US 2018/0309727 A1    Oct. 25, 2018

Related U.S. Application Data

(63) Continuation of application No. 14/839,494, filed on Aug. 28, 2015, now Pat. No. 9,942,197.

(51) Int. Cl.
*H04L 29/06* (2006.01)

(52) U.S. Cl.
CPC ...... *H04L 63/0263* (2013.01); *H04L 63/0254* (2013.01); *H04L 63/1466* (2013.01)

(58) Field of Classification Search
CPC ............. H04L 63/0263; H04L 63/1466; H04L 63/0254
See application file for complete search history.

(56) References Cited

U.S. PATENT DOCUMENTS

2010/0333167 A1\* 12/2010 Luo .......................... H04L 63/20
726/1
2013/0055384 A1\* 2/2013 Shulman ............. H04L 63/1425
726/22

\* cited by examiner

*Primary Examiner* — Khoi V Le
(74) *Attorney, Agent, or Firm* — Van Pelt, Yi & James LLP

(57) ABSTRACT

A system for web application security includes an interface and a processor. The interface of a web server is to receive a pending request made to the web server using an in-line request process. The processor of the web server is to provide information regarding the pending request to an agent process; and in the event that an instruction to block the pending request is received from the agent process at the in-line request process within a time constraint, block the pending request using the in-line request process.

20 Claims, 12 Drawing Sheets

WEB APPLICATION SECURITY ARCHITECTURE

CROSS REFERENCE TO OTHER APPLICATIONS

This application is a continuation of co-pending U.S. patent application Ser. No. 14/839,494, entitled WEB APPLICATION SECURITY ARCHITECTURE filed Aug. 28, 2015 which is incorporated herein by reference for all purposes.

BACKGROUND OF THE INVENTION

Many web applications used structured query language (SQL) to query and update data in their database. In ordinary circumstances, inputs to web applications behave as they should and provide appropriate answers to a given request. However, attacks to web applications include injecting (e.g., an SQL Injection (SQLi)) something into an input of a web application that causes the database to perform outside its intended scope. In extreme cases, attacks can cause a database to download the entire database in small chunks, to delete data, or to break access controls.

To detect SQLi and other attacks, a number of different security architecture have been implemented previously. These are typically called web application firewalls (WAF). WAFs come in mostly two types. The first type is a traditional router or firewall approach. This type sits in front of the web server looking for attack patterns. This first type could be implemented as a hardware solution on site or it could be implemented in the cloud at third party system. However, installation is complicated for the first type since it requires reworking the existing network architecture, which may be not desirable or feasible. In extreme cases, the reworking of the existing network architecture means physically moving computers and rewiring them. The first type system is also a single point of failure, which is a concern for operability. If the WAF or if the network the WAF is on has problems, traffic to the website has problems as well. Also, the request is "inline", which means that the request has to be completed in timely manner to ensure that the system performs adequately; in other words, the WAF has a limited amount of time to allow or block the request. This time requirement, limits the number and type of attacks that can be detected in real time. For example, because of the limited time for computation, the WAF may either block too many incoming requests impacting web server performance for some users that are legitimate or block too few requests essentially logging the traffic information and potentially letting some attacks through limiting effectiveness of the WAF.

The second type inserts the attack detection system inside the web server itself. This has the benefit of not re-architecting or re-configuring the network. However, the WAF system is often complex and many times larger than the web server itself, which can lead to limiting performance of the web server (e.g., using processor or memory resources) or crashing of the web server (e.g., in the event of a problem with the WAF).

BRIEF DESCRIPTION OF THE DRAWINGS

Various embodiments of the invention are disclosed in the following detailed description and the accompanying drawings.

DETAILED DESCRIPTION

Figure 1:
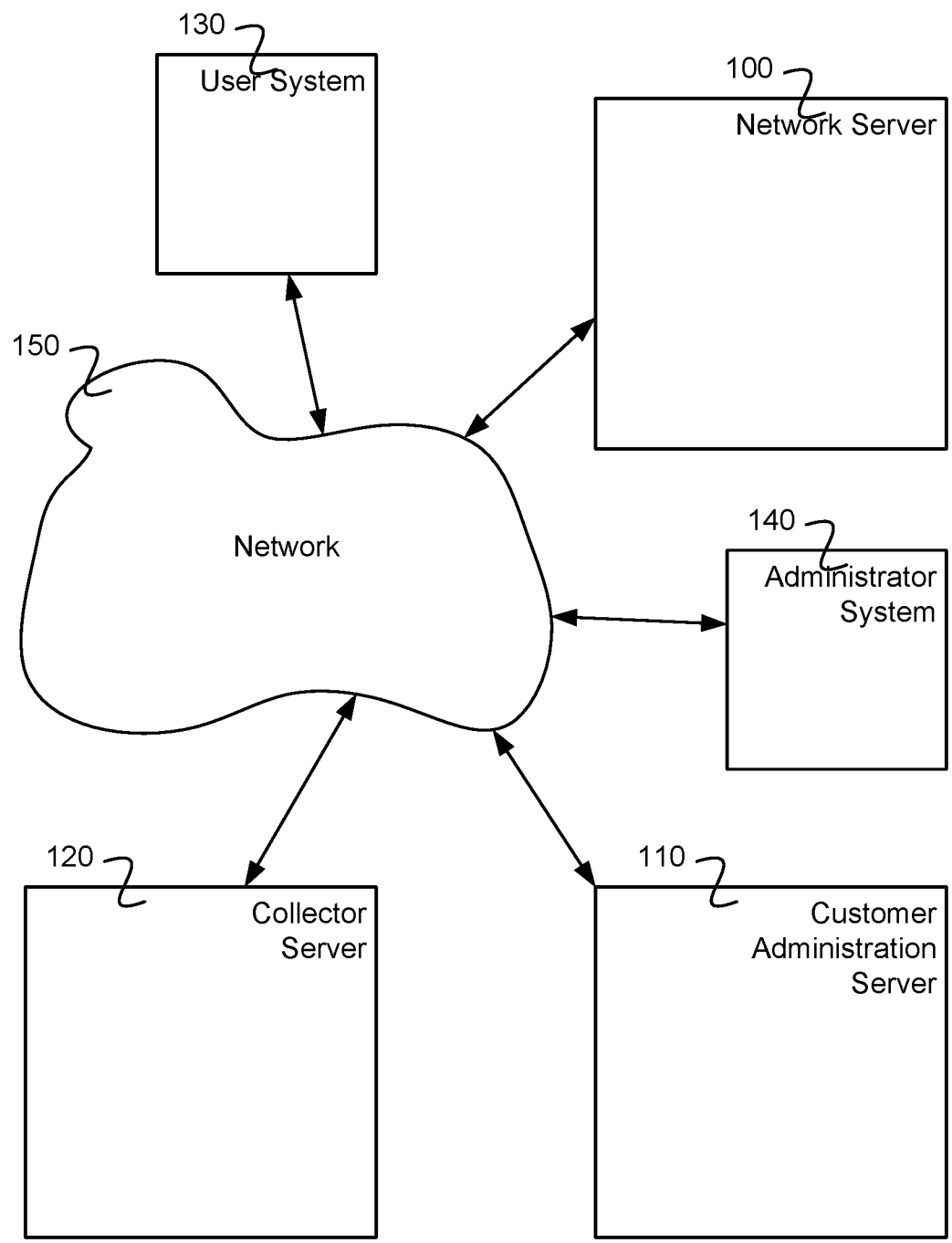
FIG. 1 is a block diagram illustrating an embodiment of a system for web application security.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for web application security is disclosed. The system comprises an interface and a processor of a web server. The interface is to receive a pending request made to the web server using an in-line request process. The processor is to provide information regarding the pending request to an agent process; and in the event that an instruction to block the pending request is received from the agent process at the in-line request process within a time constraint, block the pending request using the in-line request process. In some embodiments, the processor is coupled to a memory that is configured to store instructions and to provide the instructions to the processor.

In some embodiments, a web security architecture comprising a module, an agent, and a collector server is used. The module comprises a small "lightweight" extension to the web server that copies an incoming request to another process (the Agent) running on the same server. The module is designed to be very simple and correctness can be done "by inspection". The agent decides if a request should be blocked or not. If the agent is too slow or not running, the module will allow the request (i.e. "fail open"). Since the module is running on the same servers, installation does not require any network reconfiguration. The simplicity of the module reduces any security concern that potentially might be caused by the module itself. Since the module "fails open" the single points of failure is eliminated. While the agent may decide that a request with certainty should be blocked in most cases it just sends "interesting" traffic offsite to a "collector server". The collector server aggregates requests from the same website, and then looks at frequency, velocity, type, and source of the traffic to come to a decision. If the source exceeds a threshold, the collector server can instruct the agent to subsequently block unusual traffic. Since this decision is done out-of-band of the incoming request, the collector server can apply advanced analytics that would be impossible (e.g., in terms of the resources time, central processing unit (CPU), memory, etc.) in an inline system. By this, false positives are eliminated as a sequence of requests can be examined instead of each request just on its own. To limit the amount of traffic being sent to the agent, the module or the web server configuration may choose to not send data to the agent if the request is: 1) too big; 2) not of the right type; and 3) in a format the agent wouldn't understand. And finally since data is being sent offsite, a system of checks and balances are in place to prevent sensitive data being transmitted. This includes redacting sensitive information (e.g., a credit card number, a password, etc.). In addition, decisions across customers are syndicated. An attack on one website can trigger protection across all websites in the system.

In some embodiments, a web application uses structured query language (SQL) to query and update data in its database. For example, query to the database is SELECT*from Users where UserId=1234 and maybe the URL is http://somecompany.com/getuser?id=1234. Inside the application perhaps the code is sql_query ("SELECT*from Users where UserId=${ID}") where ID comes right from the id parameters in the URL. This would retrieve data for a single user. On the other hand, in the event that the user changes the input to http://somecompany.com/getuser?id=1234+0R+1=1 then the query becomes SELECT*from Users where UserId=1234 OR 1=1. However, using logical math, 1=1 is always true, so this query returns every user. This is an SQL injection (SQLi) attack. Attacks happen all the time on a myriad of inputs to a web application. In various embodiments, injection attacks comprise "Cross Site Scripting", in which foreign hypertext markup language (HTML) or Javascript is inserted into a page, "Command Execution", in which arbitrary commands are attempted to be run on the server, or any other appropriate attack. However to find a vulnerable input on a website an attacker may have to issue tens of thousands attempts to the web server looking for the flaw, and then many more to execute a successful attack.

In some embodiments, an agent does not natively block requests. In some embodiments, the agent starts with a list of session identifiers to block. In the event that a request comes in, the requests looks like an attack, and the session identifier is in the list, then the request is blocked. In the event that a request comes in, the request looks like an attack, and the session identifier is not in the list, then the request is allowed. In both cases, in the event that the request looks like an attack, then information is uploaded to a collector server. In some embodiments, data is aggregated from multiple agents and session identifiers are scored based on their location, the frequency of attacks originating associated with the session identifier, and the severity of attacks originating associated with the session identifier. In various embodiments, in the event that a threshold is exceeded for the score, then the session identifier is added to a blocked list, a rule is created regarding the session identifier, or any other appropriate action. In some embodiments, the system attacks are distributed, so aggregating data collection across multiple agents enables identification of problem session identifier sources possible. In some embodiments, the agent makes fast decisions based on rules provided by a collector server, thus it can make rapid (e.g., less than 1-2 ms decisions). In various embodiments, the rules for blocking requests that appear suspicious or malicious comprise pre-configured rules, explicit rules that are downloaded (e.g., a member of a blacklist, etc.), or any other appropriate rule. In some embodiments, longer time processes or calculations are made by a collector server that is able to process over long times and by aggregating multiple information sources.

In some embodiments, attacks come from a single computer source, which issues a series of attacks in a sequence or session. The most common "session identifier" is the source IP address. In some embodiments, the session identifier is not associated with a single computer and instead is associated with a number of computers. In some embodiments, a session identifier comprises a hypertext transfer protocol (HTTP) cookie. In some embodiments, a session identifier comprises a "device fingerprint", which is comprised of metadata that is accessible in the browser about the source computer, wherein the metadata comprises one or more of the following: a time zone data, a primary language data, a screen size data, a battery charge and lifetime data, an operating system data, an installed fonts data, or any other appropriate data.

In some embodiments, a system for web application security processes in-coming requests. The system receives a hypertext transfer protocol (HTTP) request at a web server. The web server includes an in-line module. The in-line module provides information regarding the request to an agent. In some embodiments, the information is provided using a local UNIX domain socket or a loopback interface. The agent analyzes the information regarding the request rapidly (e.g., in less than a millisecond, in less than a configurable time, etc.) to determine whether to allow, to block, and/or to request more information. The determination is sent to the in-line module, which proceeds to allow, to block, and/or to provide more information to the agent. In the event that no determination is sent to the in-line module, the in-line module fails, or the agent fails, the in-line module is designed to allow requests to pass through. Asynchronously, after identifying malicious signals in request(s), the agent sends relevant information about the request(s) to a collector server for further analysis. For performance and privacy reasons this step is not done by the in-line module and the full request information is not sent to the collector server. When an attack is identified, the collector server generates an updated list of rules and/or instructions for the agent to consult when making decisions on inbound requests. Visibility is provided to a web application server administrator or other user via dashboards. Also, alerts are sent to a number of services (e.g., monitoring services). In addition, an API implementation of the dashboards enables feeding into existing internal logging and security information and event management (SIEM) systems.

FIG. 1 is a block diagram illustrating an embodiment of a system for web application security. In the example shown, network server 100 receives a request (e.g., from a user using user system 130). The request is processed or not by network server 100. An in-line module and agent determine whether the request is a security problem. Information regarding security problem requests is sent to collector server 120 from network server 100. Collector server 120 determines instructions (e.g., rules, watch lists, security problems, etc.) and updates network server 100 (e.g., an agent in network server 100). The instructions are used by the agent to determine whether any given request is a security problem. An administrator using administrator system 140 is able to monitor security issues for network server 100 via customer administration server 110 that shows on a dashboard security statistics derived from data received from network server 100. Network server 100, customer administration server 110, collector server 120, user system 130, and administrator system 140 communicate using network 150. In various embodiments, network 150 comprises a wired network, a wireless network, the internet, the world wide web, a cellular network, a cable network, a satellite network, a fiber network, or any other appropriate network.

Figure 2:
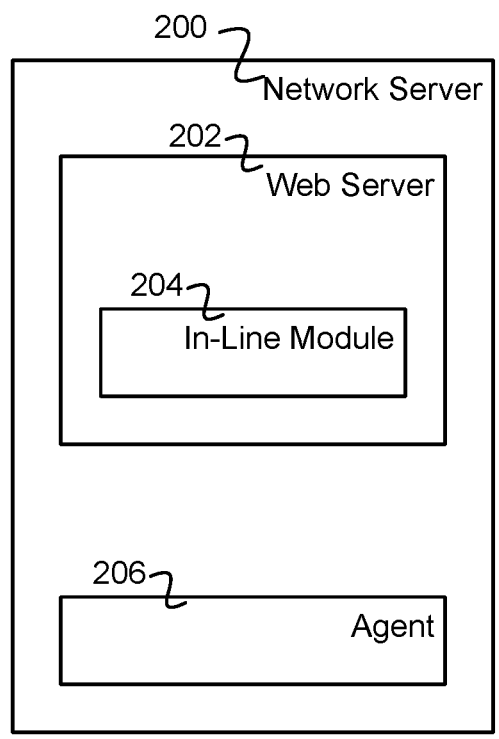
FIG. 2 is a block diagram illustrating an embodiment of a network server.

FIG. 2 is a block diagram illustrating an embodiment of a network server. In some embodiments, network server 200 comprises network server 100 of FIG. 1. In the example shown, network server 200 comprises web server 202 with in-line module 204 and agent 206. Web server 202 receives and processes an incoming request that arrives via a network. In-line module 204 provides a filtering of the incoming request and allows or blocks the request to be processed by web server 202. In-line module 204 provides information regarding the request to agent 206, which is collocated on network server 200. Agent 206 provides a fast decision regarding allowing or blocking of the incoming request based on the information received from the in-line module regarding the request. In-line module 204 also provides post-processing information in some cases to agent 206. In various embodiments, post-processing information is requested by agent 206 and/or determined by in-line module 204 (e.g., in the event of an error during processing, of a large response, of a slow response, of missing headers in the response, etc.). Agent 206 provides information to a collector server. The information is redacted and encrypted for security.

Figure 3:
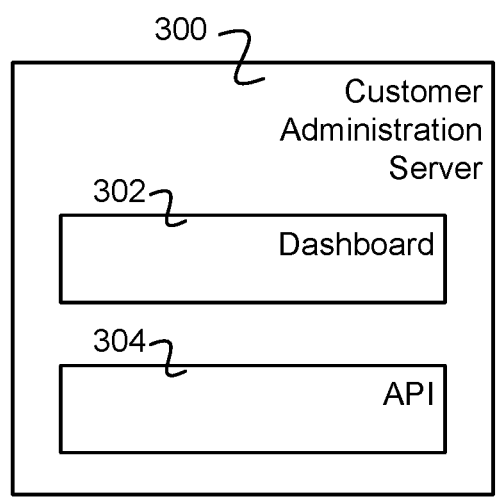
FIG. 3 is a block diagram illustrating an embodiment of a customer administration server.

FIG. 3 is a block diagram illustrating an embodiment of a customer administration server. In some embodiments, customer administration server 300 comprises customer administration server 110 of FIG. 1. In the example, shown, customer administration server 300 comprises dashboard 302 and API 304. Customer administration server 300 receives monitoring information from an agent and/or from a collector server regarding web requests handled by a web server. Dashboard 302 displays monitoring information to an administrator. API 304 enables access to monitoring information. In various embodiments, monitoring information is provided to a logging facility, security management system, event management system, or any other appropriate system or facility.

Figure 4:
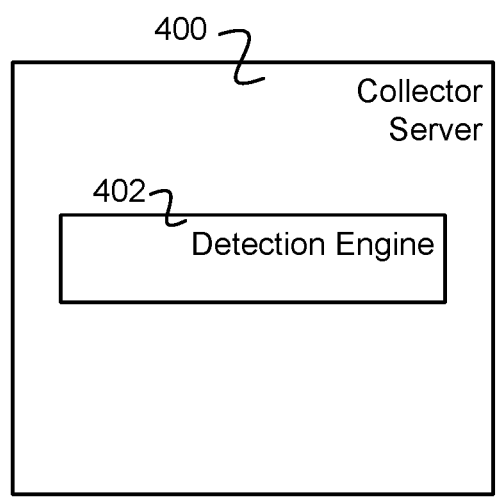
FIG. 4 is a block diagram illustrating an embodiment of a collector server.

FIG. 4 is a block diagram illustrating an embodiment of a collector server. In some embodiments, collector server 400 comprises collector server 120 of FIG. 4. In the example shown, collector server 400 includes detection engine 402. Collector server 400 receives information regarding requests from multiple agents monitoring multiple web servers. Collector server 400 receives encrypted and redacted information from an agent. The information is decrypted and annotated (e.g., with information on where it came from—for example, country information, hostname information, etc.). The information is used to determine rules and/or instructions that are provided to the agent enabling quick decisions for the in-line module. Detection engine 402 determines patterns of request from multiple agents. Detection engine 402 detects attack patterns and provides updates to rules and/or instructions to block the attacks.

Figure 5:
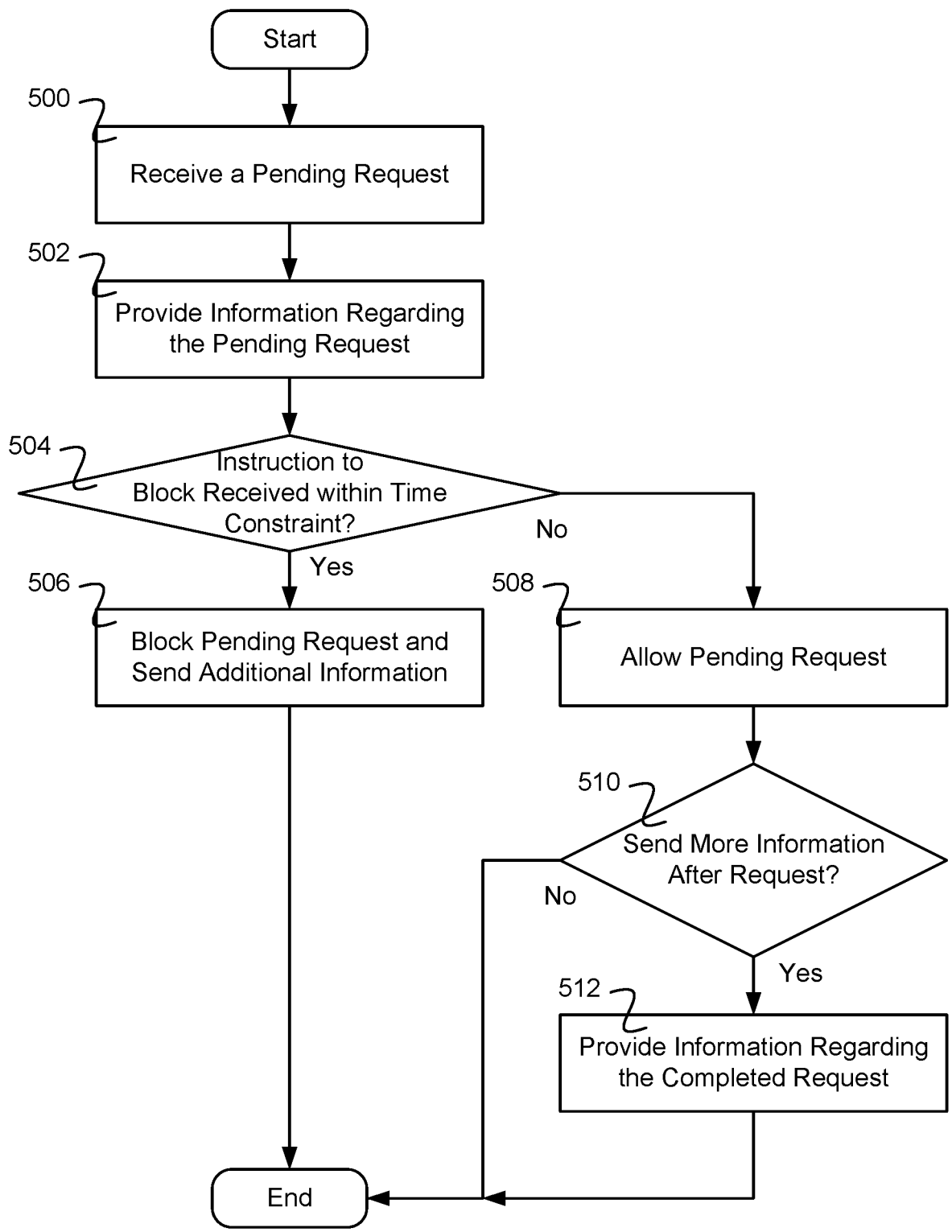
FIG. 5 is a flow diagram illustrating an embodiment of a process for web application security.

FIG. 5 is a flow diagram illustrating an embodiment of a process for web application security. In some embodiments, the process of FIG. 5 is executed on network server 100 of FIG. 1. In the example shown, in 500 a pending request is received. In 502, information is provided regarding the pending request. In 504, it is determined whether an instruction to block is received within a time constraint. In the event that an instruction to block is received, in 506 the pending request is blocked and additional information is sent, and the process ends. In the event that an instruction to block is not received, then in 508 the pending request is allowed. In 510, it is determined whether more information after the request is to be sent. In the event that more information after the request is not to be sent, the process ends. In the event that more information after the request is to be sent, then in 512 information regarding the completed request is provided.

In some embodiments, a PreRequestIn object includes information on an incoming HTTP request. For example, the information is transmitted from an in-line module to an agent using a structure such as:

```
type PreRequestIn struct {
    ModuleVersion  string    /* The module build version */
    ServerVersion  string    /* Main server identifier e.g., "apache 2.0.46..." */
    ServerFlavor   string    /* Any other webserver configuration info (if any) */
    ServerName     string       /* as in request website uniform record locator URL */
    Timestamp      int64        /* seconds elapsed since 1/1/1970 UTC (Unix Epoch time) */
    RemoteAddr     string       /* Remote IP Address from the request socket */
    Method         string    /* GET,POST,PUT,DELETE etc... */
    Scheme         string    /* `http` or `https` if transport security layer (TLS) is used. */
    URI            string       /* /path?query */
    Protocol       string    /* HTTP protocol "HTTP/1.0" "HTTP/1.1" */
    TLSProtocol    string        /* TLS protocol (empty if `Scheme` is not `https`) */
    TLSCipher      string        /* TLS cipher suite, ` (empty if `Scheme` is not `https`) */
```

```
    HeadersIn    [ ][2]string /* nil ok, this is an array of 2-tuple strings */
    PostBody     string       /* empty string if none */
}
```

In some embodiments, a PreRequestOut object is a response to the PreRequestIn message. For example, a block or allow response or a request for more information (e.g., requestID) from an agent to an in-line module is made using a structure such as:

```
// PreRequestOut is sent back with a PreRequestIn message
// it has a HTTP response code, and an optional universally unique
identifier (UUID) type PreRequestOut struct {
    WAFResponse int32 /* Only values are 200 (OK), or 406 (Block the
       request) */
    RequestID   string /* May be empty */
}
```

In some embodiments, sensitive HTTP headers are not sent from an in-line module to an agent. For example, headers comprising a cookie, an authorization, an x-auth-token, or a set-cookie are not sent from the in-line module to the agent. This prevents any sensitive tokens from being handled by the agent. One may completely not send the header and its value, or send the header with a blank value.

In some embodiments, a limited set of HTTP methods are sent from an in-line module to an agent. For example, only GET, POST, DELETE, PUT, PATCH request types have information in their headers that is sent from the in-line module to the agent. In some embodiments, other request types (e.g., OPTIONS, etc.) are ignored and the web server completes the requests of the other request types; Other request types are ignored and therefore never interpreted as attacks.

In some embodiments, an UpdateIn object is used after a request is finished and represents an update to a previous request. For example, UpdateIn is a follow-up message from an in-line module of a webserver to an agent where there is no formal response to this message:

```
type UpdateIn struct {
    RequestID    string      /* the request id, PreRequestOut */
    WAFResponse  int32       /* the value from the PreRequestOut */
    HeadersOut [ ][2]string /* nil ok, this is an array of 2-tuple strings */
    ResponseCode   int32   /* what http status code did the webserver send
       back */
    ResponseMillis int32 /* How many milliseconds did the full request
       take */
    ResponseSize   int32 /* how many bytes did the webserver send
       back */
}
```

In some embodiments, a PostRequestIn object is used after a request is finished and represents a full request. For example, the contents of a PreRequestIn object and an UpdateIn object are sent from an in-line module of a webserver to an agent where there is no formal response to this message:

```
            type PostRequestIn struct {
                PreRequestIn /* see above */
                UpdateIn     /* see above */
            }
```

In some embodiments, a PreRequestOut object is a response to the PreRequestIn message. For example, a block or allow response or a request for more information (e.g., requestID) from an agent to an in-line module. Additionally, the response may contain a list of key-value pairs that may be added to the original request. The in-module may use these to set addition HTTP headers so that the application may understand why the Agent took the action it did.

```
type PreRequestOut struct {
    WAFResponse   int32   /* Only values are 200 (OK), or 406 (Block
       the request)
*/
    RequestID     string  /* May be empty */
    RequestHeaders [ ][2]string /* optional, to set additional request
       headers */
}
```

In some embodiments, an in-line module hooks into two places in a web server or request life-cycle. For example, in Apache HTTPD (HTTP Daemon) and Nginx web servers, an application programming interface (API) is named with an authorization process (i.e. before the request is run), and a logging process (after the response happened). In some embodiments, in the event that the request is a "subrequest" or "internal redirect", the request passes through and is not sent to the in-line module. In some embodiments, in the event that the HTTP Method of the request is not a GET, PUT, POST, PATCH, or DELETE method, the request passes through and is not sent to the in-line module. In some embodiments, relevant pieces of the HTTP request are collected and a PreRequestIn object is created.

In some embodiments, for the authorization process, in the event that the HTTP method is a POST or a PUT, then the following steps are performed to see determine whether post body data should be read, copied, and sent to an agent:
in the HTTP Request Header, get the Content-Length header;
in the event that it is missing, do not read or send the post body;
in the event that the value is negative or greater than some threshold, do not read or send the post body;
in the event that the Content-Type header does not contain any of the following (case in-sensitive), do not read or send the post body:
application/x-www-form-urlencoded
json
javascript
Otherwise, instruct the web server to read the post data and copy it.

In some embodiments, upon receiving a request at an in-line module, using the appropriate transport the following is sent:
[0, counter, "RPC.PreRequest", prerequestobject]
In the event that the transport fails, the in-line module fails open. The response should be:
[1, counter, error, PreRequestOut]
In the event that the counter does not match the previous transmissions, the in-line module fails open. In the event that there is an error, the in-line module fails open. Recall that the PreRequestOut is of the following form:

```
type PreRequestOut struct {
    WAFResponse  int32  /* Only values are 200 (OK), or 406 (Block the request)
*/
    RequestID  string  /* May be empty */
    RequestHeaders [ ][2]string /* optional, to set additional request headers */
}
```

For RequestID:
  If it is not the empty string (0 length), save it for use in the logging phase.
For WAFResponse can only be two values 200 or 406. Specifically:
  If WAFResponse is 200, let the request flow normally.
  If WAFResponse is 406, end the request returning HTTP code 406.
  Otherwise, fail open (i.e. if not a normal HTTP response, fail open)
Note: "ending the request with 200" is different than letting the request process normally in some web servers.

In some embodiments, for the logging process, in the event that the RequestID is not empty, an update request is sent. For example, the following is sent:
[0, counter, "RPC.UpdateRequest", updateobj]
In the event that the RequestID is empty and any of the following are true:
  the final HTTP response>=400
  the total duration of the response>=threshold
  the if the total size of the response>=threshold
Then send a PostRequestIn message, which is a combination of the PreRequestIn and UpdateIn messages. The PostBody is not sent and instead an empty string is sent or this field is omitted from being sent. For example, the following is sent:
[0, counter, "RPC.PostRequest", postrequestobject]
In both cases, the response is not important, and there is no action to take on error.

In some embodiments, the following are data flows between an in-line module and an agent. For example, a benign post request is:

```
{
    "ModuleVersion": "0.214",
    "ServerVersion": "Apache/2.4.7 (Ubuntu) PHP/5.5.9-1ubuntu4.11 OpenSSL/1.0
.1f",
    "ServerFlavor": "prefork",
    "ServerName": "soysauce.in",
    "Timestamp": 1438838135,
    "RemoteAddr": "69.162.16.14",
    "Method": "POST",
    "Scheme": "https",
    "URI": "/add-data"
    "Protocol": "HTTP/1.1",
    "TLSProtocol": "TLSv1.2",
    "TLSCipher": "ECDHE-RSA-AES128-SHA256",
    "HeadersIn": [
        [ "Host", "soysauce.in" ],
        [ "Accept", "*/*" ],
        [ "Connection", "keep-alive" ],
        [ "Cookie", "" ],
        [ "User-Agent", "Mozilla/5.0 (Macintosh; Intel Mac OS X 10_10_4) AppleWebK
it/600.7.12 (KHTML, like Gecko) Version/8.0.7 Safari/600.7.12"],
        [ "Accept-Language", "en-us" ],
        [ "Referer", "https://soysauce.in/" ],
        [ "Accept-Encoding", "gzip, deflate" ],
    ],
    "PostData": "foo=bar&company=something"
}
```

Note that the HeadersIn and the Cookie value are redacted and that the TLSProtocol and TLS Cipher are filled in. Because the request is benign, the returned response allows the request to proceed (e.g., a 200 response). For example, the response is:

```
{
    "WAFResponse": 200
}
```

In some embodiments, the following are data flows between an in-line module and an agent. For example, a benign request with an error in it is:

```
$ curl -v '127.0.0.1:8085/junk'
*   Trying 127.0.0.1...
* Connected to 127.0.0.1 (127.0.0.1) port 8085 (#0)
> GET /junk HTTP/1.1
> User-Agent: curl/7.37.1
> Host: 127.0.0.1:8085
> Accept: */*
>
< HTTP/1.1 404 Not Found
< Content-Type: text/plain; charset=utf-8
< Date: Wed, 05 Aug 2015 18:38:24 GMT
< Content-Length: 19
<
```

The request is converted to the following:

```
{
    "ModuleVersion": "1.0",
    "ServerVersion": "go1.4.2",
    "ServerFlavor": "",
    "ServerName": "127.0.0.1:8085",
    "Timestamp": 1438799904,
    "RemoteAddr": "127.0.0.1",
    "Method": "GET",
    "Scheme": "http",
    "URI": "/junk",
    "Protocol": "HTTP/1.1",
    "HeadersIn": [
        [ "User-Agent", "curl/7.37.1" ],
        [ "Accept", "*/*" ]
    ],
}
```

The response is to allow the request to pass through:

```
{
    "WAFResponse": 200
}
```

The server proceeds normally. In the event that an error condition occurred at the end of the request or in the event that request had a response with exceptionally large output or had a response that took an exceptionally long time, then a request is made for follow up information. An example of the follow up information is:

```
{
    "ModuleVersion": "1.0",
    "ServerVersion": "go1.4.2",
    "ServerFlavor": "",
    "ServerName": "127.0.0.1:8085",
    "Timestamp": 1438799904,
    "RemoteAddr": "127.0.0.1",
    "Method": "GET",
    "Scheme": "http",
    "URI": "/junk",
    "Protocol": "HTTP/1.1",
    "WAFResponse": 200,
    "ResponseCode": 404,
    "ResponseMillis": 1,
    "ResponseSize": 19,
    "HeadersIn": [
        [ "User-Agent", "curl/7.37.1" ],
        [ "Accept", "*/*" ],
    ],
    "HeadersOut": [
        [ "Content-Type", "text/plain; charset=utf-8" ],
    ]
}
```

In some embodiments, the following are data flows between an in-line module and an agent. For example, a blocked request with a structured query language (SQL) injection is. The raw HTTP headers are:

```
curl -v '127.0.0.1:8085/junk?id=1+UNION+ALL+SELECT+1'
* Connected to 127.0.0.1 (127.0.0.1) port 8085 (#0)
> GET /junk?id=1+UNION+ALL+SELECT+1 HTTP/1.1
> User-Agent: curl/7.37.1
> Host: 127.0.0.1:8085
> Accept: */*
>
< HTTP/1.1 406 Not Acceptable
< Content-Type: text/plain; charset=utf-8
< Date: Wed, 05 Aug 2015 17:59:46 GMT
< Content-Length: 19
<
406 not acceptable
```

This translates to the following flow. The in-line module sends the following to the agent:

```
{
    "ModuleVersion": "1.0",
    "ServerVersion": "go1.4.2",
    "ServerFlavor": "",
    "ServerName": "127.0.0.1:8085",
    "Timestamp": 1438796694,
    "RemoteAddr": "127.0.0.1",
    "Method": "GET",
    "Scheme": "http",
    "URI": "/junk?id=1+UNION+ALL+SELECT+1",
    "Protocol": "HTTP/1.1",
    "HeadersIn": [
        [ "Accept", "*/*" ],
        [ "User-Agent", "curl/7.37.1" ],
    ],
}
```

The agent replies with the following. Note the RequestID is filled in, along with an X-SigSci-Tags header describing was found (SQLi in this case).

```
{
    "WAFResponse": 406,
    "RequestID": "55c24b96ca84c02201000001",
    "RequestHeaders": [
        [ "X-SigSci-Tags", "SQLI" ]
```

```
    ]
}
```

The request is blocked and follow-up information is requested.

```
{
    "RequestID": "55c24b96ca84c02201000001",
    "ResponseCode": 406,
    "ResponseMillis": 1,
    "ResponseSize": 19,
    "HeadersOut": [
        [ "Content-Type", "text/plain; charset=utf-8" ],
    ]
}
```

Figure 6:
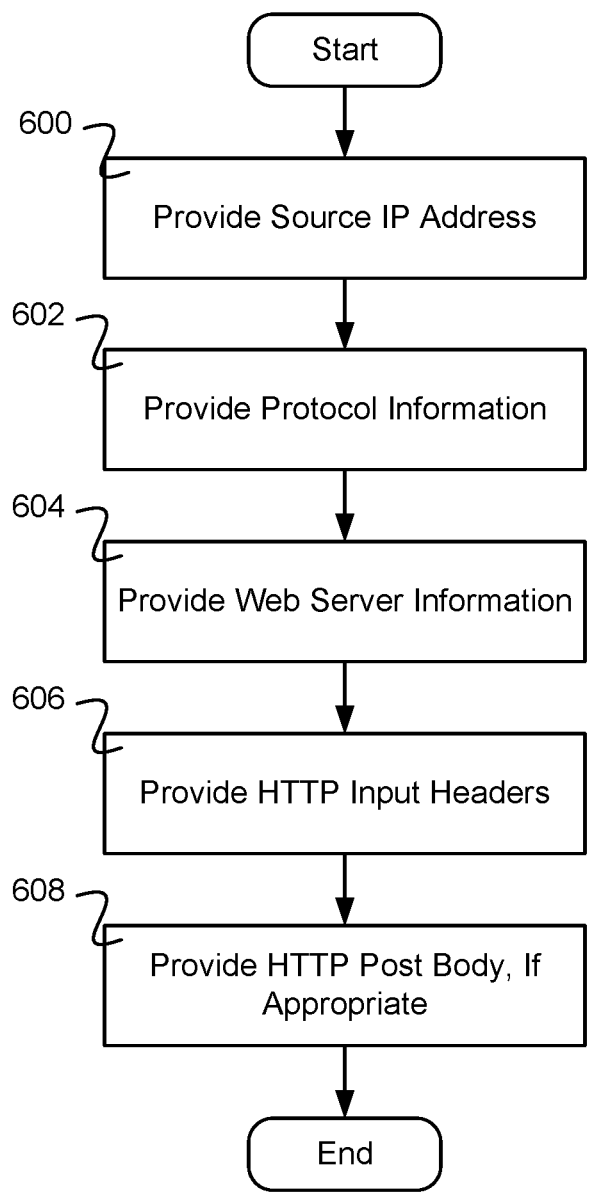
FIG. 6 is a flow diagram illustrating an embodiment of a process for providing information regarding a pending request.

FIG. 6 is a flow diagram illustrating an embodiment of a process for providing information regarding a pending request. In some embodiments, the process of FIG. 6 is used to implement 502 of FIG. 5. In the example shown, in 600 source IP is provided. In 602, protocol information is provided. In 604, web server information is provided. In 606, HTTP input headers are provided. In 608, HTTP post bodies are provided, if appropriate.

Figure 7:
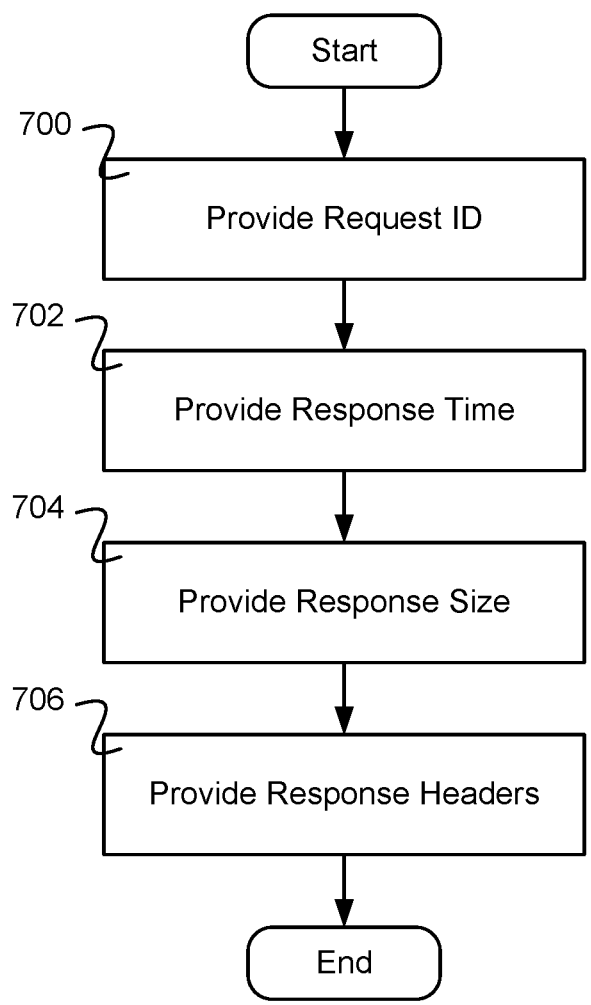
FIG. 7 is a flow diagram illustrating an embodiment of a process for providing information regarding a completed request.

FIG. 7 is a flow diagram illustrating an embodiment of a process for providing information regarding a completed request. In some embodiments, the process of FIG. 7 is used to implement 512 of FIG. 5. In the example shown, in 700, a request ID is provided. In 702, a response time is provided. In 704, response size is provided. In 706, response headers are provided.

Figure 8:
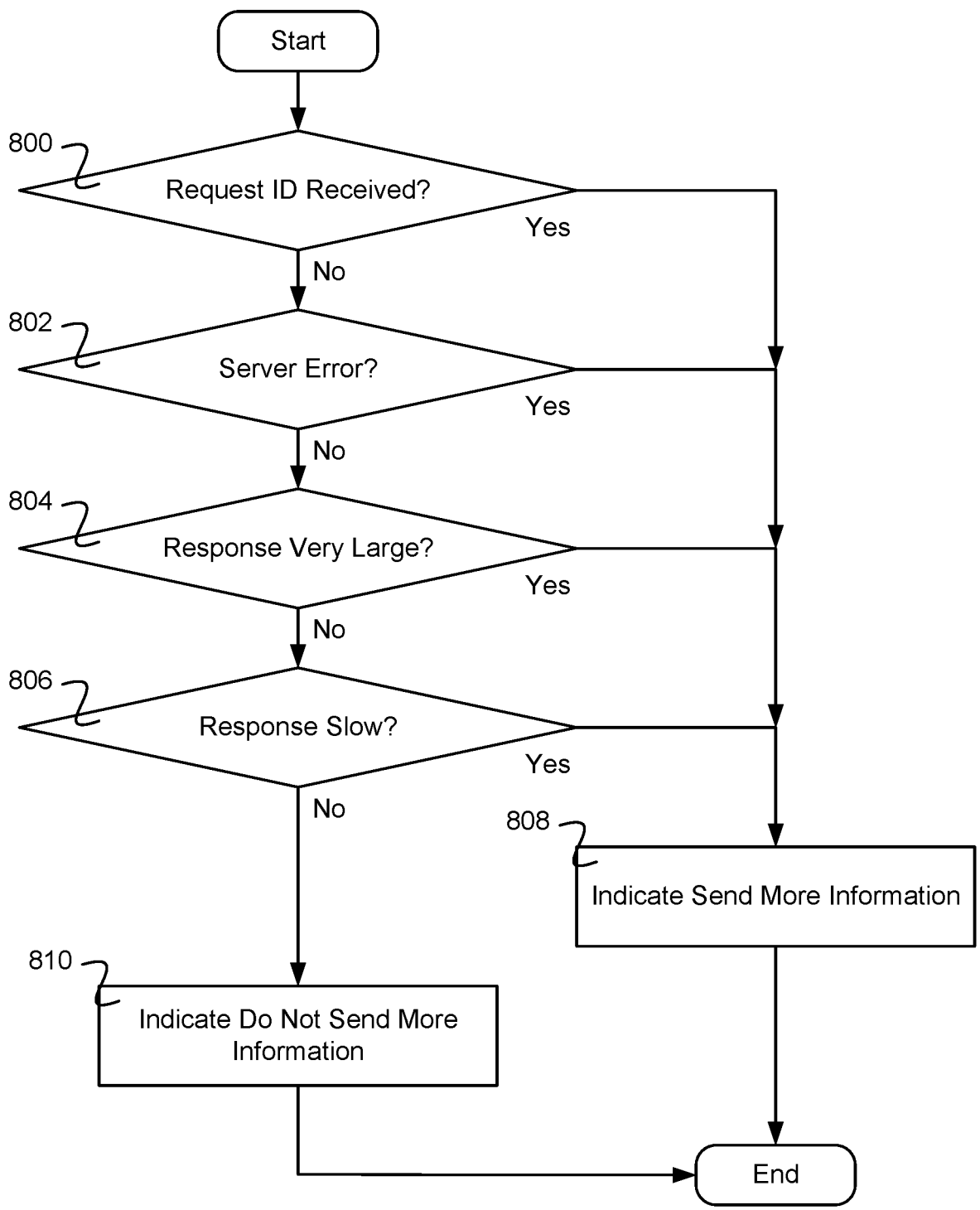
FIG. 8 is a flow diagram illustrating an embodiment of a process for determining whether more information after the request is to be sent.

FIG. 8 is a flow diagram illustrating an embodiment of a process for determining whether more information after the request is to be sent. In some embodiments, the process of FIG. 8 is used to implement 510 of FIG. 5. In the example shown, in 800 it is determined whether a request ID is received. In the event that a request ID is received, control passes to 808. In the event that a request ID is not received, then in 802 it is determined whether there is a server error. In the event that there is a server error, then control passes to 808. In the event that there is not a server error, then in 804 it is determined whether the response is very large. In the event that the response is very large, then control passes to 808. In the event that the response is not very large, then in 806 it is determined whether the response is slow. In the event that the response is slow, then control passes to 808. In the event that the response is not slow, then in 810 it is indicated to not send more information. In 808, it is indicated to send more information.

Figure 9:
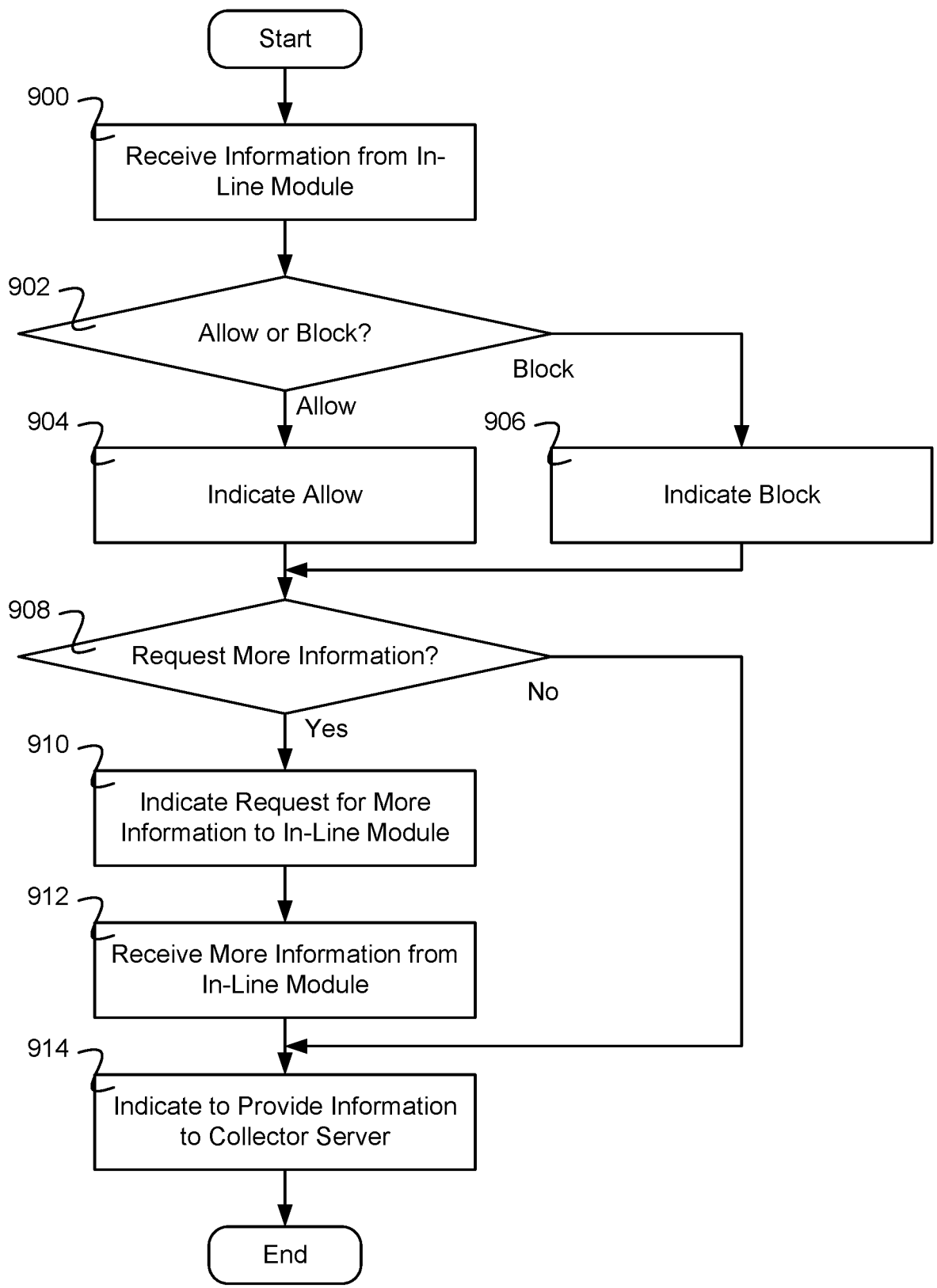
FIG. 9 is a flow diagram illustrating an embodiment of a process of an agent.

FIG. 9 is a flow diagram illustrating an embodiment of a process of an agent. In some embodiments, the process of FIG. 9 is executed on agent 206 of FIG. 2. In the example shown, in 900 information from the in-line module is received. In 902, it is determined whether to allow or block. In the event that it is determined to block, then in 906 it is indicated to block, and control passes to 908. In the event that it is determined to allow, then in 908 it is indicated to allow, and control passes to 908. In 908, it is determined whether more information is requested. In the event that more information is not requested, control passes to 914. In the event that more information is requested, then in 910 it is indicated to request more information to the in-line module. In 912, more information is received from the in-line module, and control passes to 914. In 914, it is indicated to provide information to a collector server.

Figure 10:
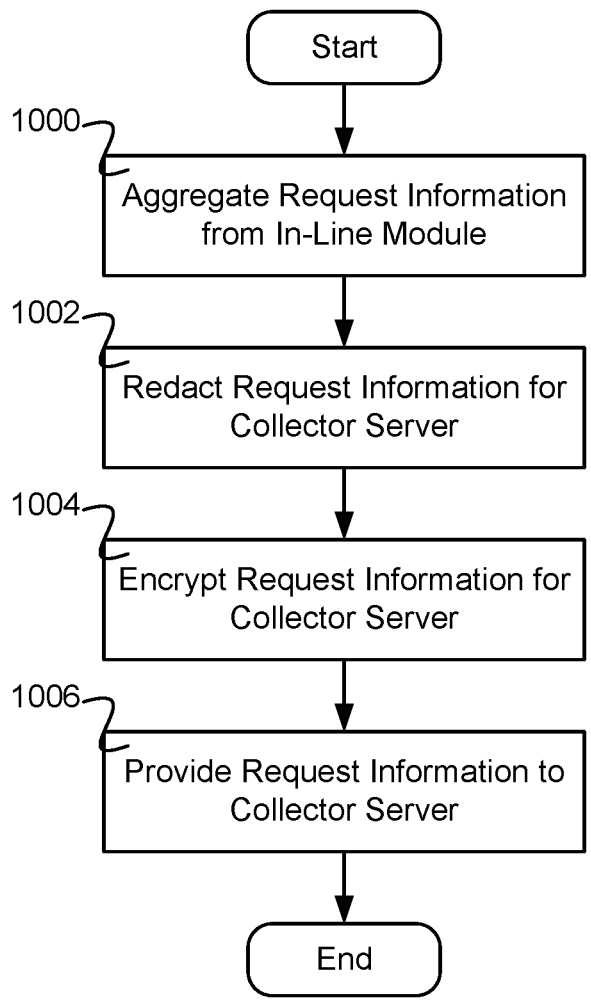
FIG. 10 is a flow diagram illustrating an embodiment of a process of a collector server.

FIG. 10 is a flow diagram illustrating an embodiment of a process of a collector server. In some embodiments, the process of FIG. 10 is executed in network server 100 of FIG. 1. In the example shown, in 1000 request information is aggregated. For example, an agent locally does pre-filtering to determine whether the request contains an attack. Once the agent identifies an attack or anomaly in the request, it sends only explicitly defined headers (e.g., HTTP method and version, request path, hostname, and user agent) and parameters with identified attacks to the collector server, after additional filtering/sanitizing is done. In 1002, request information for collector server is redacted. In 1004, request information for collector server is encrypted. In 1006, request information is provided to a collector server.

In some embodiments, redaction comprises automatic removal of sensitive parameters, fields, and patterns. For example, api_key, password, passwd, pass, pw, user, login, loginid, username, email, key, id, sid, token, request_token, access_token, oauth_verifier, confirm_password, password_confirmation, social Security numbers, credit card numbers, and bank routing numbers are automatically removed or replaced with a replacement indicator (e.g., [redacted]'). An example of a portion of a request received at the web server:

POST/example HTTP/1.1
foo=bar&username=<script>alert("jsmith")</script> which is redacted prior to sending to the collector server to:

POST/example HTTP/1.1
username=[redacted]

An example of a portion of a request received at the web server:

POST/example HTTP/1.1
foo=bar&credit_card_example=<script>alert("4321-4321-4321-4321")</script> which is redacted prior to sending to the collector server to:

POST/example HTTP/1.1
credit_card_example=<script>alert("[redacted]")</script>

In some embodiments, credit cards are determined by filtering all values similar to a credit card pattern (e.g., xxxx-xxxx-xxxx-xxxx—for example, 4012-8888-8888-1881). In some embodiments, social security numbers are determined by filtering all values similar to a social security number pattern (e.g., xxx-xx-xxxx—for example, 078-05-1120). In some embodiments, globally unique identifiers (GUID's) are determined by filtering all values similar to a GUID pattern (e.g., xxxxxxxx-xxxx-xxxx-xxxx-xxxxxxxxxxxx—for example, 3F2504E0-4F89-41D3-9A0C-0305E82C3301). In some embodiments, bank account numbers (IBAN) are determined by filtering all values similar to an IBAN pattern (e.g., xxxx-xxxx-xxxx-xxxx-xxxx-x—for example, CH93-0076-2011-6238-5295-7). In some embodiments, bank account routing numbers are determined by filtering all values similar to a bank account routing number pattern (e.g., xxxxxxxxx—for example, 011103093).

Figure 11:
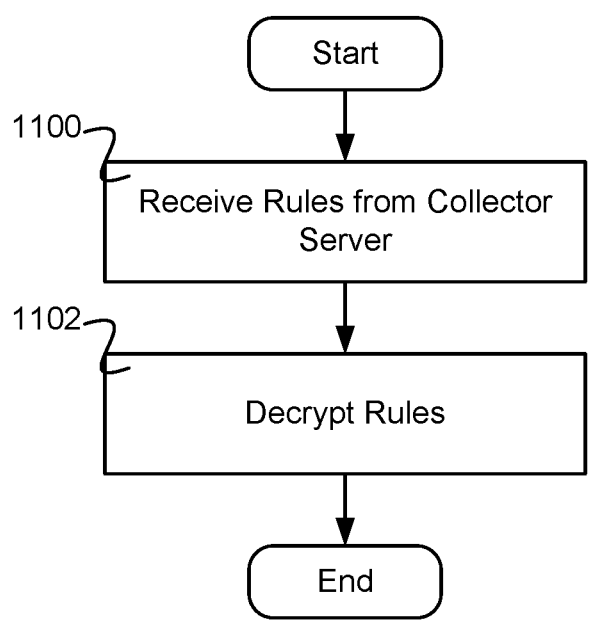
FIG. 11 is a flow diagram illustrating an embodiment of a process for an agent.

FIG. 11 is a flow diagram illustrating an embodiment of a process for an agent. In some embodiments, the process of FIG. 11 is executed on agent 206 of FIG. 2. In the example shown, in 1100 rules from a collector server are received. In 1102, rules are decrypted.

Figure 12:
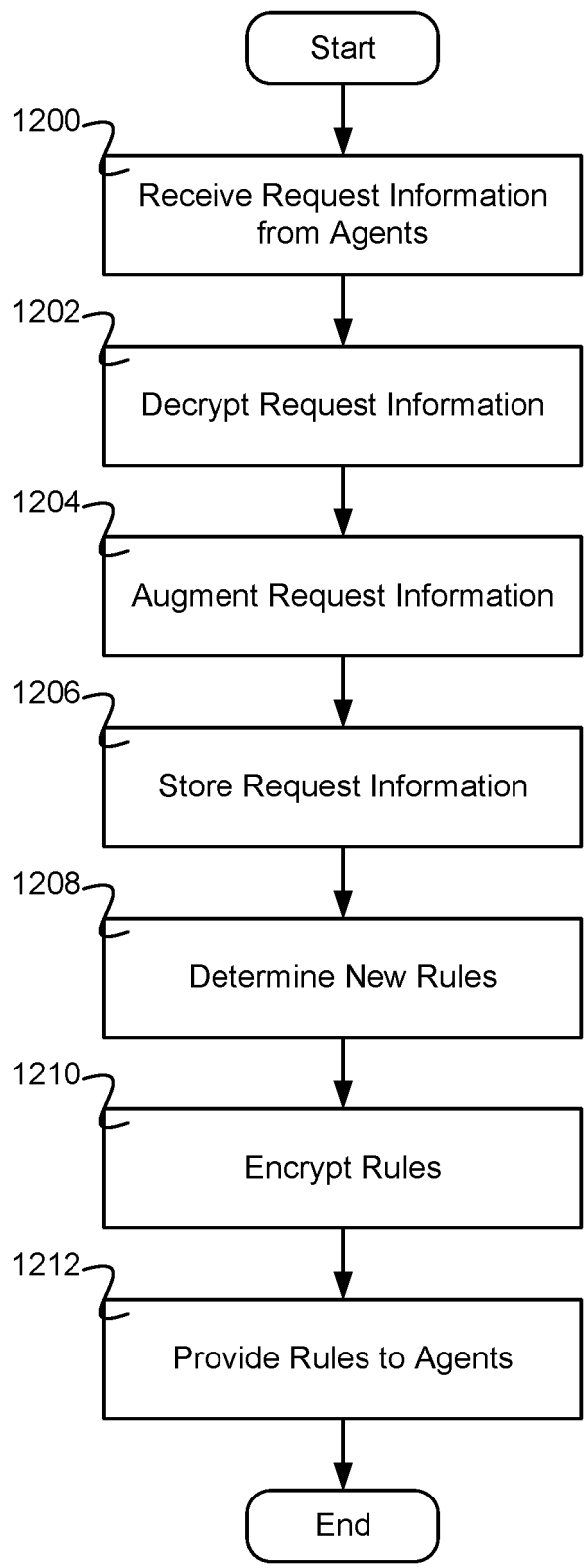
FIG. 12 is a flow diagram illustrating an embodiment of a process for a collector server.

FIG. 12 is a flow diagram illustrating an embodiment of a process for a collector server. In some embodiments, the process of FIG. 12 is executed in collector server 120 of FIG. 1. In the example shown, in 1200 request information from agents is received. In 1202 request information is decrypted. In 1204, request information is augmented. In 1206, request information is stored. In 1208, new rules are determined. In 1210, rules are encrypted. In 1212, rules are provided to agents.

In some embodiments, a variety of metadata about the agent, the module, and the host server is uploaded periodically. For example, an agent uploads the following to a collector server:

```
{
    "DecisionTimeHisto": { },
    "Meta": {
        "ServerHostname": "vagrant-apache",
        "ServerOS": "darwin",
        "ServerNumCPU": 4,
        "ServerArch": "amd64",
        "AgentAddress": "unix",
        "AgentVersion": "1.8.local_build",
        "AgentBuildID":
        "4335e57e5276cdb935b6d23042b360556f9b14cd",
        "AgentArgs": "/Users/nickg/gopath/bin/agent -server-hostname
vagrant-apache -debug-log-all-the-things -accesskeyid=redacted
-secretaccesskey=redacted - upload-interval=2s
-upload-url=https://collector.signalsciences- dev.net:8082/0/push
-download-interval=60s -server-timeout=60s -download- url=file:///tmp ",
        "AgentTimezone": "PDT",
        "AgentTimezoneOffset": -25200,
        "ModuleVersion": "1.0",
        "ModuleServer": "go1.4.2",
        "AgentTimestampUTC": 1438883470,
        "AgentWAFConfigMD5":
        "e34c761bbaa3452a8043930c4aa7a408",
        "AgentWAFConfigDate": "2015-08-06117:51:00.283944184Z",
        "AgentWAFConfigCounter": 0,
        "AgentEnabled": 0,
        "AgentTotalRequests": 38,
        "AgentCurrentRequests": 0,
        "AgentNumGoroutines": 9,
        "AgentUptimeSeconds": 10,
        "AgentMemAlloc": 7663624,
        "AgentNumGC": 13,
        "AgentDecisionTimes": {
            "50th": 0.454274,
            "95th": 0.872402,
            "99th": 1.068073
        },
        "AgentErrors": 0,
        "AgentTimestampLocal": 0,
        "AgentTotalGCPauseMilli": 22.75546,
        "CorpIDHex": "",
        "SiteIDHex": "",
        "ServerRemoteAddr": "",
        "UploadSize": 0,
        "Updated": "0001-01-01T00:00:00Z",
    "Signals": [
        {
            "RequestID": "55c39f57ca84c03302000089",
            "ServerHostname": "vagrant-apache",
            "Timestamp": 1438883671,
            "ServerName": "127.0.0.1:8085",
            "Scheme": "http",
            "URI": "/proxy",
            "Path": "/proxy",
            "UserAgent": "curl/7.37.1",
            "RemoteAddr": "8.8.8.8",
            "RemoteHostname": "",
            "RemoteCountryCode": "",
            "Method": "GET",
            "Protocol": "HTTP/1.1",
            "WAFResponse": 200,
            "ResponseCode": 200,
            "ResponseSize": 3,
            "ResponseMillis": 1,
            "Summation": {
                "Attrs": null,
                "Attacks": null
            },
            "SignalList": [
                {
                    "Type": "XSS",
```

-continued

```
            "Location": "QUERYSTRING",
            "Value": "key=", <--- notice in this case redacted
              since "key" is sensitive
            "Detector": "LIBINJECTION"
          }
        ]
      }
    "Errors": [
      {
        "Log Level": 1,
        "Message": "Checking for new agent rules",
        "Timestamp": "2015-08-06T17:53:00.287671907Z"
      },
      {
        "Log Level": 1,
        "Message": "Agent rules not updated",
        "Timestamp": "2015-08-06T17:53:00.287858532Z"
      }
    },
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for web application security, comprising:
a hardware web server comprising:
an interface of the hardware web server configured to:
receive a pending request made to the hardware web server using an in-line request process;
a hardware processor of the hardware web server configured to:
provide information regarding the pending request to an agent process, wherein the agent process communicates with a collector server, wherein the agent process implements rules received from the collector server, wherein a rule of the rules is based at least in part on a pending request session identifier;
determine, using collector instructions, whether the pending request is a security problem by the agent process and provide an instruction to block or not;
block the pending request using the in-line request process to prevent web application attacks in the event that an instruction to block the pending request is received from the agent process at the in-line request process within a time constraint;
allow the pending request using the in-line request process in the event that the instruction to block or not is not received within the time constraint.

2. The system of claim 1, wherein the session identifier is associated with a single computer.

3. The system of claim 1, wherein the session identifier is associated with a plurality of computers.

4. The system of claim 1, wherein the session identifier comprises a source IP address.

5. The system of claim 1, wherein the session identifier comprises an HTTP cookie.

6. The system of claim 1, wherein the session identifier comprises a device fingerprint.

7. The system of claim 6, wherein the device fingerprint comprises browser accessible metadata information.

8. The system of claim 7, wherein the browser accessible metadata information comprises a time zone data.

9. The system of claim 7, wherein the browser accessible metadata information comprises a primary language data.

10. The system of claim 7, wherein the browser accessible metadata information comprises a screen size data.

11. The system of claim 7, wherein the browser accessible metadata information comprises a battery charge and lifetime data.

12. The system of claim 7, wherein the browser accessible metadata information comprises an operating system data.

13. The system of claim 7, wherein the browser accessible metadata information comprises an installed fonts data.

14. The system of claim 1, wherein the session identifier is found on a list of session identifiers to block.

15. The system of claim 1, wherein a score associated with a session identifier is determined.

16. The system of claim 15, wherein the score is determined based at least in part on an agent location, an agent frequency of attacks, or an agent severity of attacks.

17. The system of claim 15, wherein, in the event it is determined that the score exceeds a threshold, a rule is created regarding the session identifier or the session identifier is added to a blocked list.

18. The system of claim 15, wherein the score comprises a score aggregated across multiple agents.

19. A method for web application security, comprising:
receiving a pending request made to the hardware web server using an in-line request process by an interface;
providing, using a hardware processor, information regarding the pending request to an agent process, wherein the agent process communicates with a collector server, wherein the agent process implements rules received from the collector server, wherein a rule of the rules is based at least in part on a pending request session identifier;
determining, using collector instructions, whether the pending request is a security problem by the agent process and provide an instruction to block or not;
blocking the pending request using the in-line request process to prevent web application attacks in the event that an instruction to block the pending request is received from the agent process at the in-line request process within a time constraint; and
allowing the pending request using the in-line request process in the event that the instruction to block or not is not received within the time constraint.

20. A computer program product for web application security,
the computer program product being embodied in a non-transitory computer readable storage medium and comprising computer instructions for:
receiving a pending request made to the hardware web server using an in-line request process by an interface;
providing, using a hardware processor, information regarding the pending request to an agent process, wherein the agent process communicates with a collector server, wherein the agent process implements rules received from the collector server, wherein a rule of the rules is based at least in part on a pending request session identifier;
determining, using collector instructions, whether the pending request is a security problem by the agent process and provide an instruction to block or not;
blocking the pending request using the in-line request process to prevent web application attacks in the event that an instruction to block the pending request is received from the agent process at the in-line request process within a time constraint; and allowing the pending request using the in-line request process in the event that the instruction to block or not is not received within the time constraint.

* * * * *